(12) United States Patent
Cannella

(10) Patent No.: US 8,003,902 B1
(45) Date of Patent: Aug. 23, 2011

(54) INTEGRATED AUTOMOTIVE HORN/LIGHT APPARATUS AND METHOD

(76) Inventor: Robert Cannella, Delray Beach, FL (US)

( * ) Notice: Subject to any disclaimer, the term of this patent is extended or adjusted under 35 U.S.C. 154(b) by 735 days.

(21) Appl. No.: 12/008,225

(22) Filed: Jan. 9, 2008

(51) Int. Cl.
*H01H 9/00* (2006.01)
(52) U.S. Cl. .................. 200/61.54; 200/61.27; 200/1 B
(58) Field of Classification Search ............... 200/61.54, 200/1 B
See application file for complete search history.

(56) References Cited

U.S. PATENT DOCUMENTS

| | | | | |
|---|---|---|---|---|
| 3,670,174 | A * | 6/1972 | Sakakibara | 307/10.1 |
| 4,273,971 | A * | 6/1981 | Tregurtha | 200/4 |
| 4,697,092 | A * | 9/1987 | Roggendorf et al. | 307/10.1 |
| 6,545,233 | B2 * | 4/2003 | Takezawa | 200/6 A |

* cited by examiner

*Primary Examiner* — Renee S Luebke
*Assistant Examiner* — Lheiren Mae Caroc
(74) *Attorney, Agent, or Firm* — Lorusso & Associates

(57) ABSTRACT

An apparatus and method for simultaneously operating the horn and light systems of a motorized vehicle is provided. The controller used to operate the systems can be a single controller that operates the horn when a certain range of pressure is applied to the controller and operates the horn and lights systems when a stronger pressure is applied. The system can include a dedicated horn operating system controller independent of the dual function controller to eliminate the need for differing pressures to operate the horn and light systems substantially simultaneously.

15 Claims, 11 Drawing Sheets

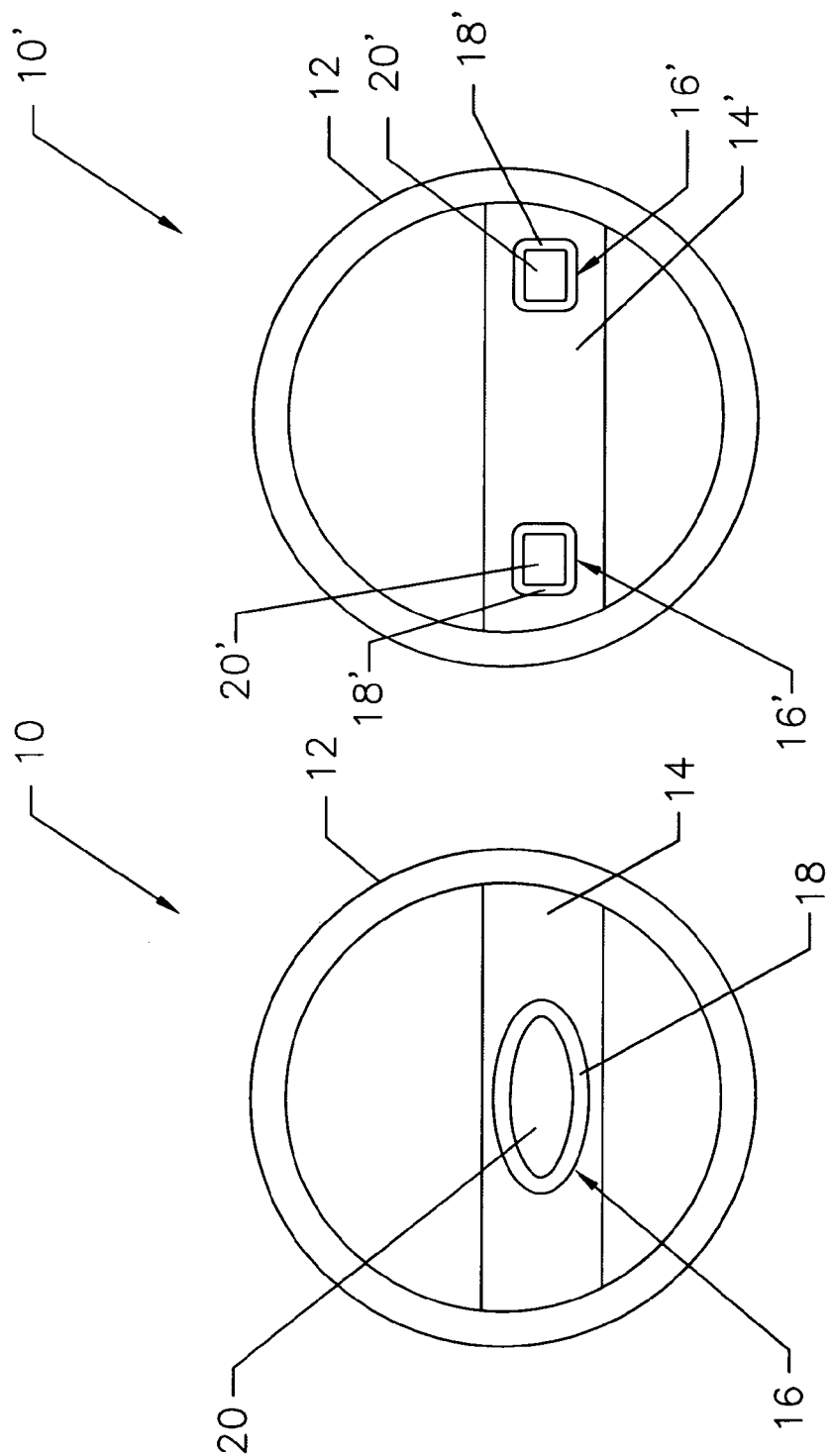

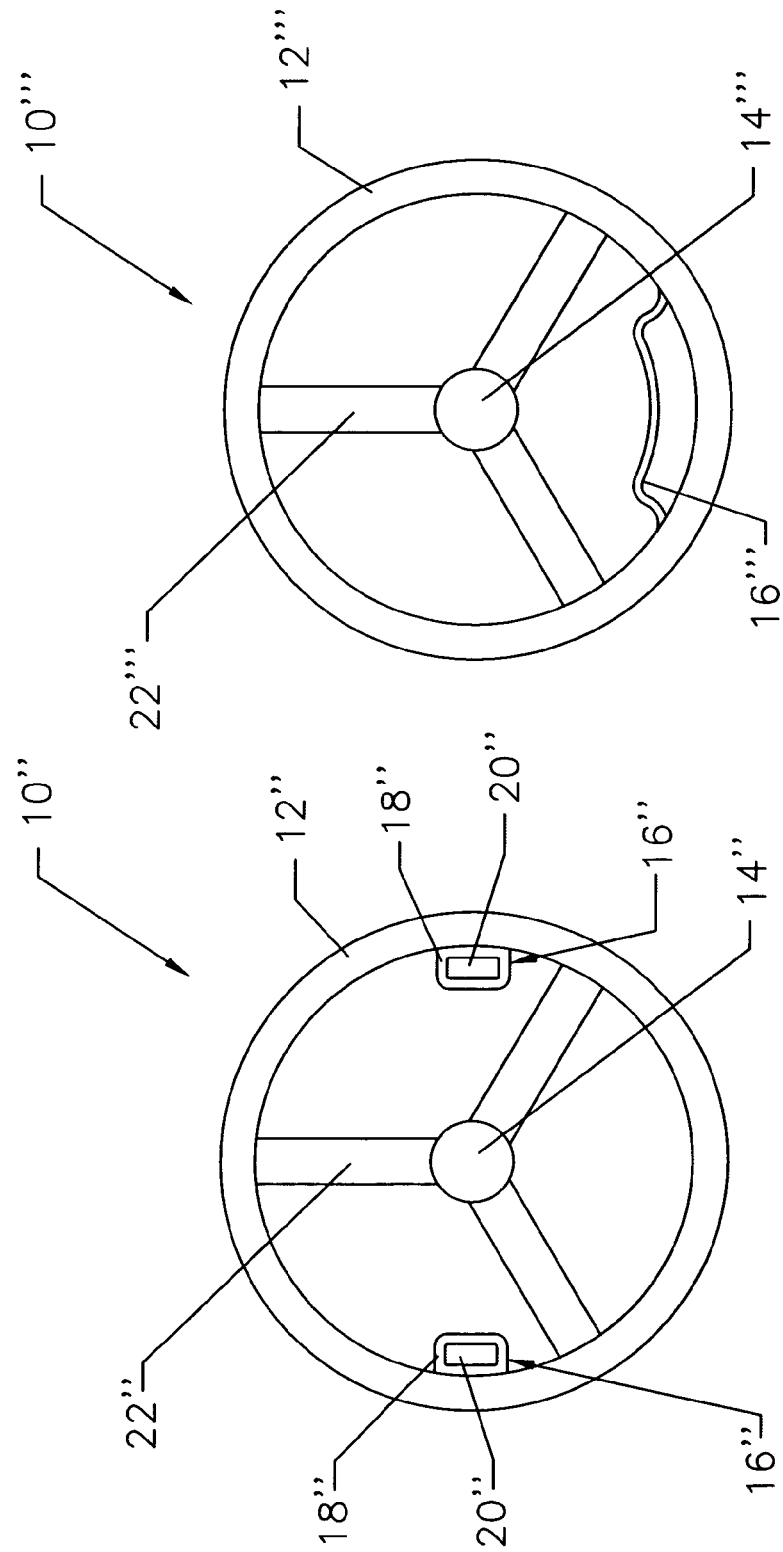

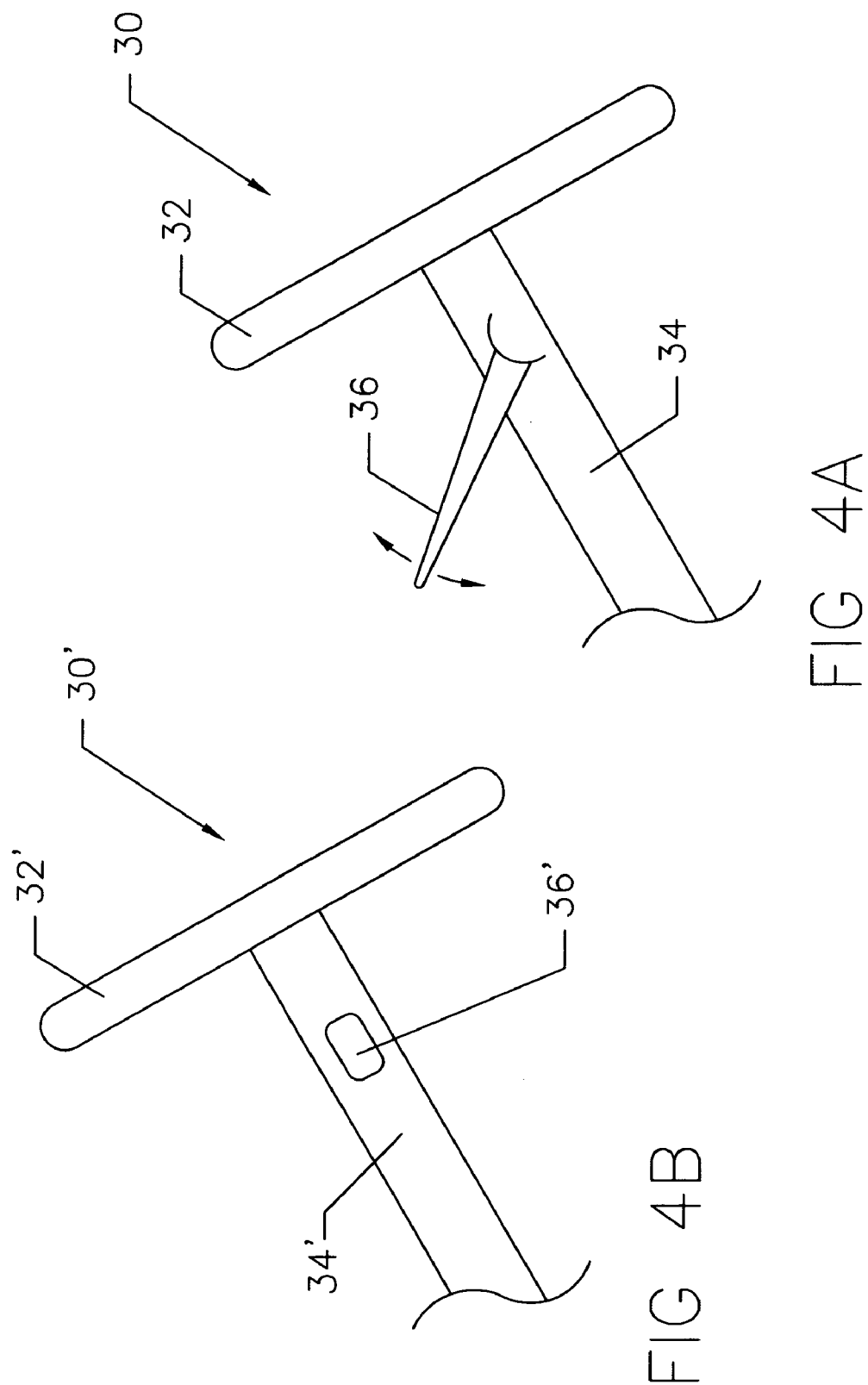

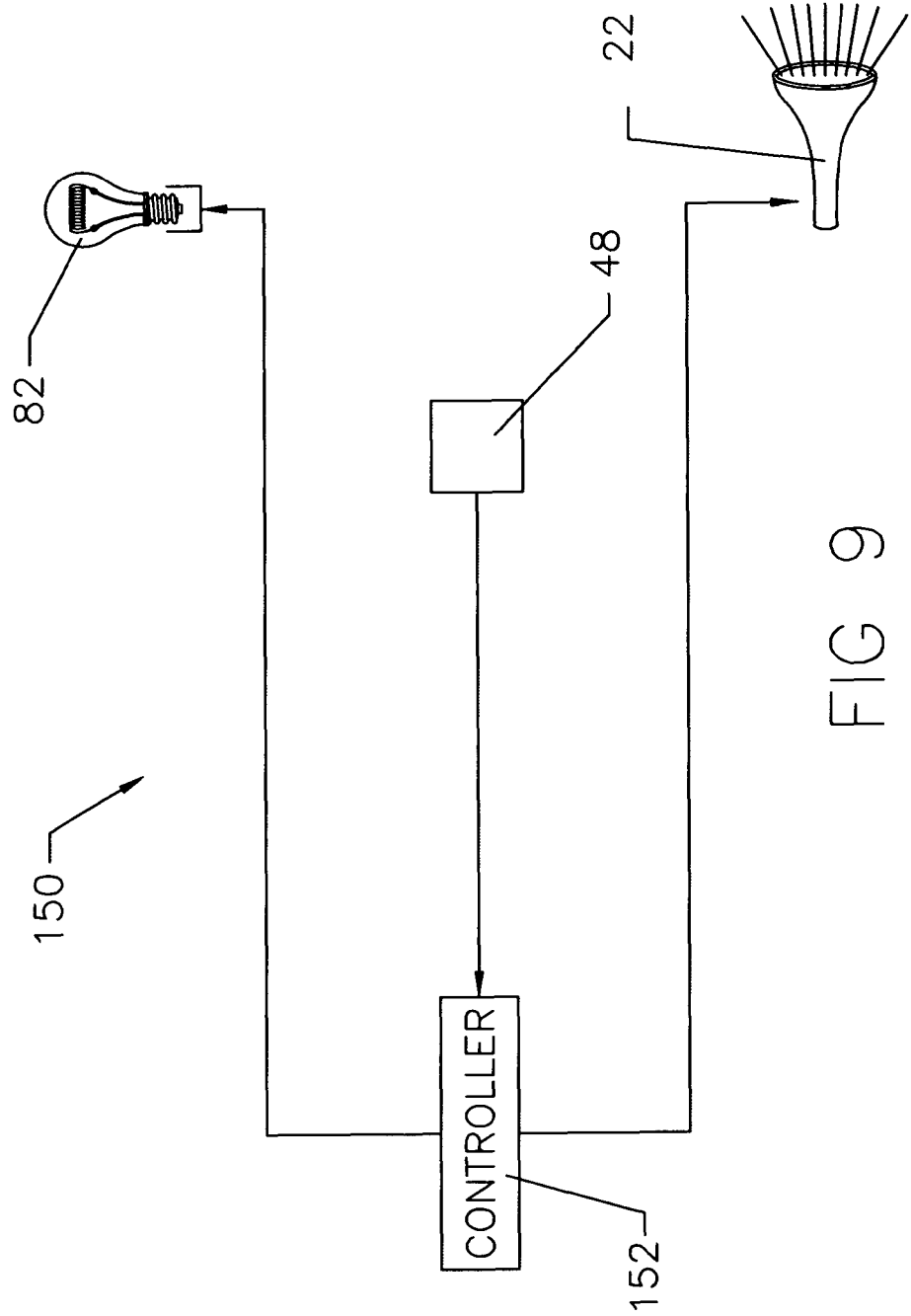

US 8,003,902 B1

INTEGRATED AUTOMOTIVE HORN/LIGHT APPARATUS AND METHOD

CROSS REFERENCE TO RELATED APPLICATIONS

None

BACKGROUND OF THE INVENTION

The present disclosure relates to a method and apparatus for simultaneously operating and enhancing multiple automotive warning systems when an operator engages one of the systems. More particularly, the present disclosure relates to a method and apparatus for sending audible and visual warning signals when an operator engages an audible warning device in a vehicle.

DESCRIPTION OF THE ART

As is commonly known, automotive vehicles, (cars, trucks, vans, SUV's, tractor trailers, buses, etc.), include a horn that can be engaged to produce audible warnings to the operators of other vehicles and/or to pedestrians. Horns work particularly well in rather quiet environments, such as country roadways, where the variety and intensity of sound is limited and relatively subdued. Busy city roads are another matter. Due to the high level of noise as well as the cacophony of sounds, horn signals are often hard to hear particularly by those with diminished hearing. Added to this are the ever advancing automobile sound systems which, in conjunction with improved sound proofing technologies used to block out sounds emanating from outside a vehicle, can severely attenuate and even block out sound warning signals sufficiently to prevent perception by passengers in third party vehicles.

What is needed and what I have devised is an apparatus and method to provide a visual warning signal coordinated with the emission of an audible warning signal to enhance third party recognition to a potentially hazardous situation.

SUMMARY OF THE INVENTION

In one aspect of the present disclosure, a combined audio/visual warning signal system is provided that coordinates the horn and light systems of motorized vehicle horns and exterior and/or interior lights to provide both an audible and visible emergency or hazard warning to third party vehicle passengers and pedestrians within the reception range of the signals. The system is engaged with a single source controller positioned in the steering wheel, steering column and/or lever extending from the steering column. In one embodiment, differing levels of pressure applied to the controller activate the horn system individually or the horn system/light system simultaneously. The lights and horn can be directly connected via hardwire to the controller. Alternatively, the lights and horn can be connected to a central processing system that engages the lights and horn when a signal is received from the controller.

In another aspect of the present disclosure, the horn and lights are wirelessly connected, e.g., via radio frequency communication, to either the controller or an intermediate central processing system. The lights engaged by the system can vary to include one or more sets of vehicle lights to adjust the intensity of the visual emission and/or to comply with any local, state and/or federal regulations. Additionally, the lights may be programmed to flash during selected intervals to convey a specific type of warning.

In another aspect of the present disclosure, a disengagement controller is provided to enable a vehicle operator to disengage the combined horn/light system so the horn function can be operated independent of the lights. The disengagement controller can be positioned on the steering wheel, on the steering column, on a lever projecting from the steering column, on the vehicle dash board, on a vehicle door, or on any center console, or at any location ergonomically convenient to the vehicle operator.

In a further aspect of the disclosure, to enable a vehicle operator to engage the horn without the lights, an auxiliary control is provided within or without the field of the combined system controller. The auxiliary control can be positioned on the steering wheel, steering column or on a lever projecting from the steering column. These and other aspects of the disclosure will become apparent from a review of the appended drawings and the detailed description.

BRIEF DESCRIPTION OF THE DRAWINGS

FIG. 1 is a top view of a steering wheel and horn controller assembly according to one embodiment of the present disclosure;

FIG. 2 is a top view of a steering wheel and horn controller assembly according to another embodiment of the disclosure.

FIG. 3 is a top view of a steering wheel and horn controller assembly according to a further embodiment of the disclosure.

FIG. 4 is a top view of a steering wheel and horn controller bar assembly according to a yet further embodiment of the disclosure.

FIG. 4A is a side view of a steering wheel column and steering wheel assembly with a horn lever extending from the steering wheel column according to yet another embodiment of the disclosure.

FIG. 4B is a side view of a steering wheel column and steering wheel assembly with a horn control button according to a still further embodiment of the disclosure.

FIG. 9 shows a schematic of a combined horn/light operating system with a central processing controller according to one embodiment of the disclosure.

DETAILED DESCRIPTION OF THE INVENTION

Figure 5:
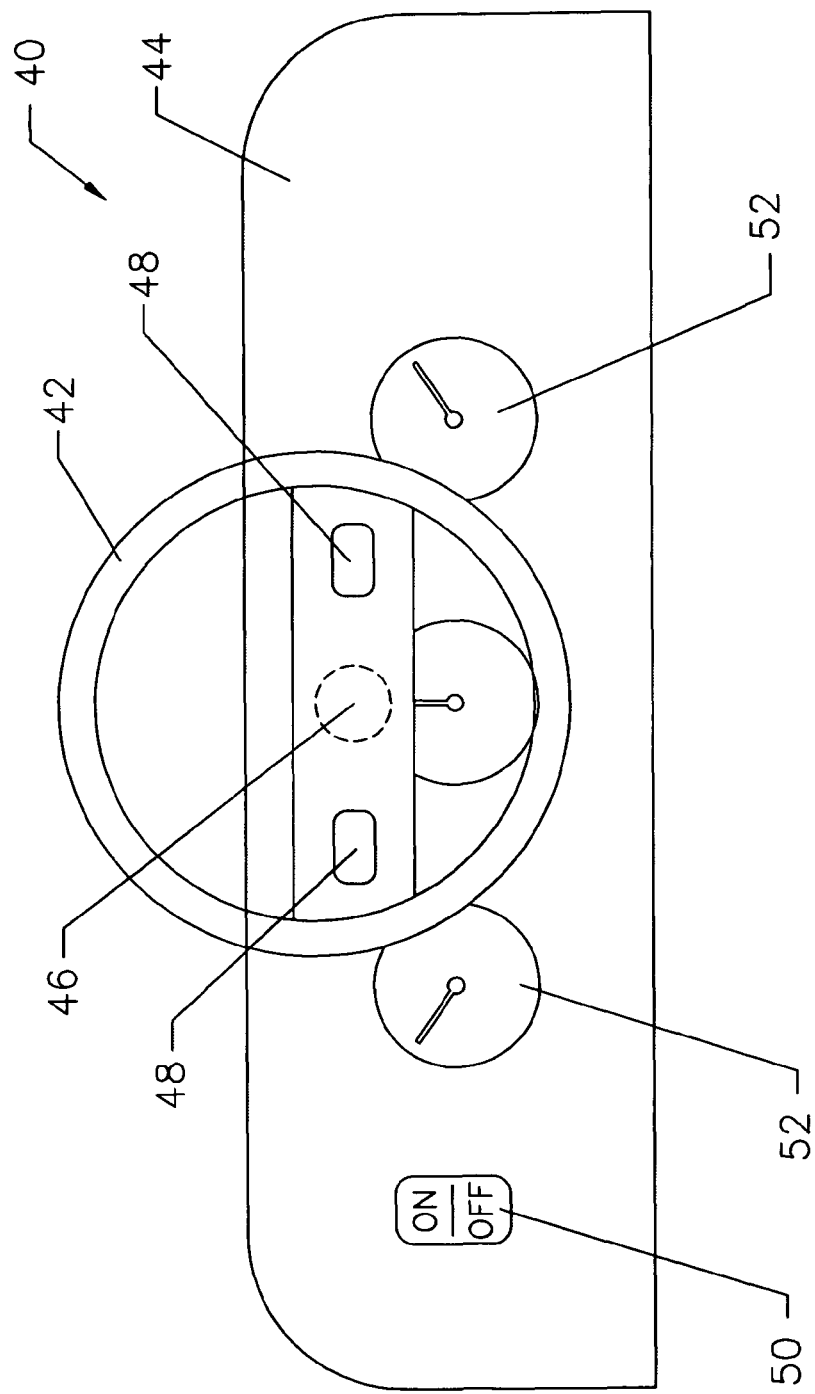
FIG. 5 shows a front view of an automotive dash board with horn/light combined controller de-select switch with steering wheel and steering wheel column in phantom according to yet another embodiment of the disclosure.

Referring to the drawings and, in particular, FIG. 1, one aspect of the present disclosure provides a vehicle steering wheel and combined horn/light controller assembly for a vehicle shown generally as reference numeral 10. Assembly 10 includes a steering wheel 12 connected to a steering wheel center spoke 14. Situated in the approximate center of spoke 14 is a dual horn/light controller shown generally as 16. Controller 16 includes horn controller 18 and a combination horn/light controller 20. Horn controller 18 enables the user to select the horn function only. Combination horn/light controller 20 allows simultaneous operation of both the horn and the vehicle lights.

Referring to FIG. 2, another embodiment of a steering wheel and horn/light controller assembly is shown generally at 10'. It should be understood that elements referenced with primed numbers in one embodiment correspond to elements in other embodiments with the same unprimed or differently primed numbers. Assembly 10 has a steering wheel 12' and a center spoke 14' that includes two dual horn/light controllers 16' positioned at opposing lateral ends of spoke 14' adjacent to or in close proximity to the juncture of spoke 14' and steering wheel 12' to provide ease of access during vehicle operation. Like the prior embodiment, controller 16' has a horn controller 18' and a horn/light controller 20' positioned centrally within an inner wall of horn controller 18'.

Horn controller 18' enables a vehicle operator to operate the horn without simultaneous light operation. Horn/light controller 20' enables the operator to operate the horn and lights with a single controller. Either lateral controller 16 can be engaged individually or in conjunction with the other lateral controller to operate the horn/light systems.

Referring to FIG. 3, another embodiment of the steering wheel and horn/light controller assembly is shown generally at 10". Assembly 10" includes a steering wheel 12" and a hub 14" connected to steering wheel 12" with a plurality of steering wheel spokes 22". A pair of dual horn/light controllers 16" is positioned on an inner radial edge of steering wheel 12" at approximately the 9:00 and 3:00 positions when the steering wheel is positioned for straight travel. The location of the dual controllers can be placed at different locations on the steering wheel without departing from the scope of the invention.

Controllers 16" include a horn controller 18" and a horn/light controller 20" that perform the same functions as the similar elements shown in FIG. 2. The primary difference from the embodiment shown in FIG. 2 is that the controllers are situated to provide maximum ease of access for the vehicle operator.

Referring to FIG. 4, an alternative embodiment of the steering wheel and horn/light controller assembly is shown generally as 10'''. Assembly 10" includes a steering wheel 12''' having a hub 14''' attached to wheel 12" via a plurality of spokes 22'''. A horn/light control bar 16''' is attached to steering wheel 12''' to allow simultaneous operation of the horn and light systems of the vehicle. Bar 16''' imparts the same function as horn/light controller 20" and 20' described with the previous embodiments of the assembly. The horn/light function is engaged by depressing the bar forward and down relative to steering wheel 12'''. In an alternate embodiment, a second bar can be incorporated into steering wheel 12''' to enable an operator to operate the horn independent of the vehicle light system.

Referring to FIG. 4A, a steering column/steering wheel assembly is shown generally as 30 with a steering wheel 32 connected to a steering column 34 with a horn/light control lever 36 attached to column 34. Lever 36 is configured to provide a vehicle operator with the ability to sound an audible alarm simultaneously with the operation of the vehicle light system. Lever 36 can be configured to engage the horn/light systems via movement in either the forward or rearward directions.

Referring to FIG. 4B, another embodiment of the steering column/steering wheel assembly is shown generally at 30'. In this embodiment, a button controller 36' is substituted for the lever controller 36 of the previous embodiment. Operation of the horn/light system is performed by depressing button controller 36'. Alternatively, button controller 36' can be configured with a lock feature, such as those well known in the art for securing a hazard signal, to allow the operator to lock controller 36' in an operational position to provide a sustained audible/visual signal.

Figure 6:
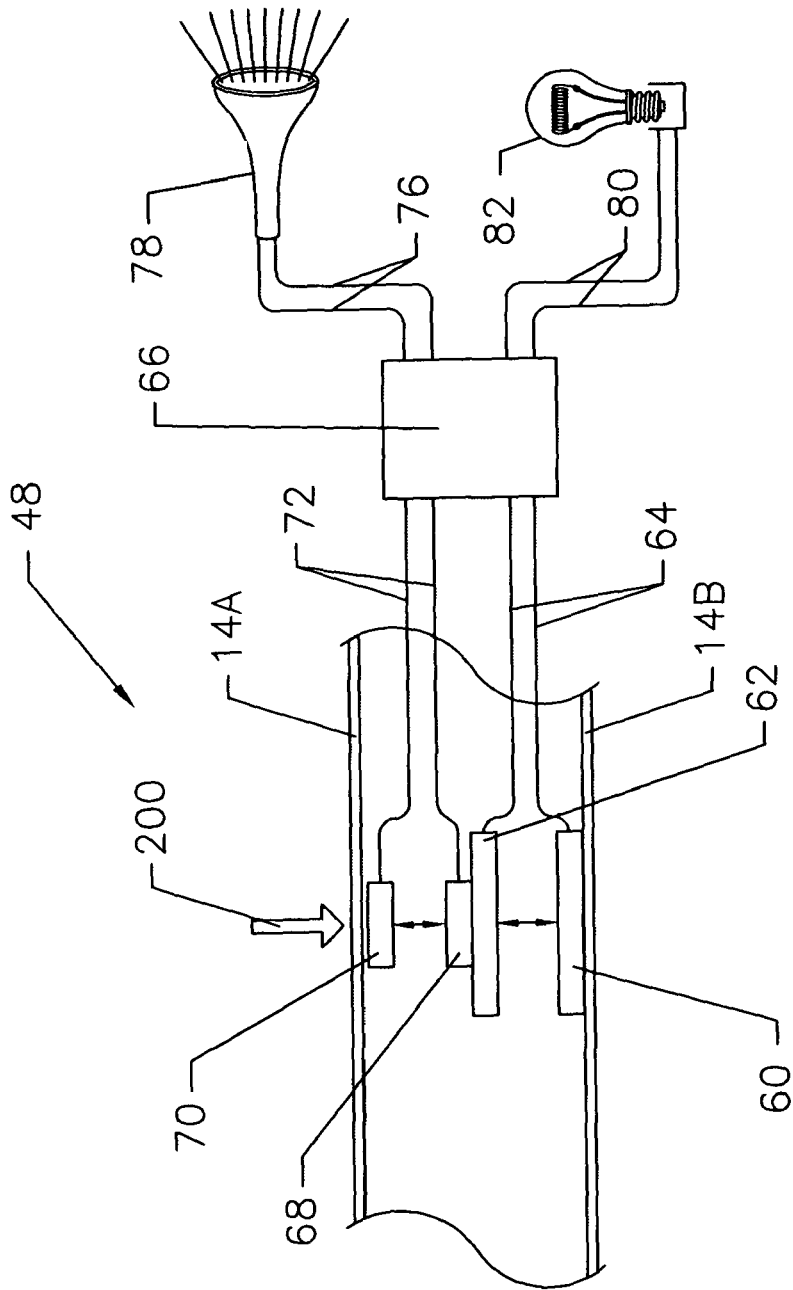
FIG. 6 shows a schematic of a horn/light controller according to one embodiment of the disclosure.
Figure 7:
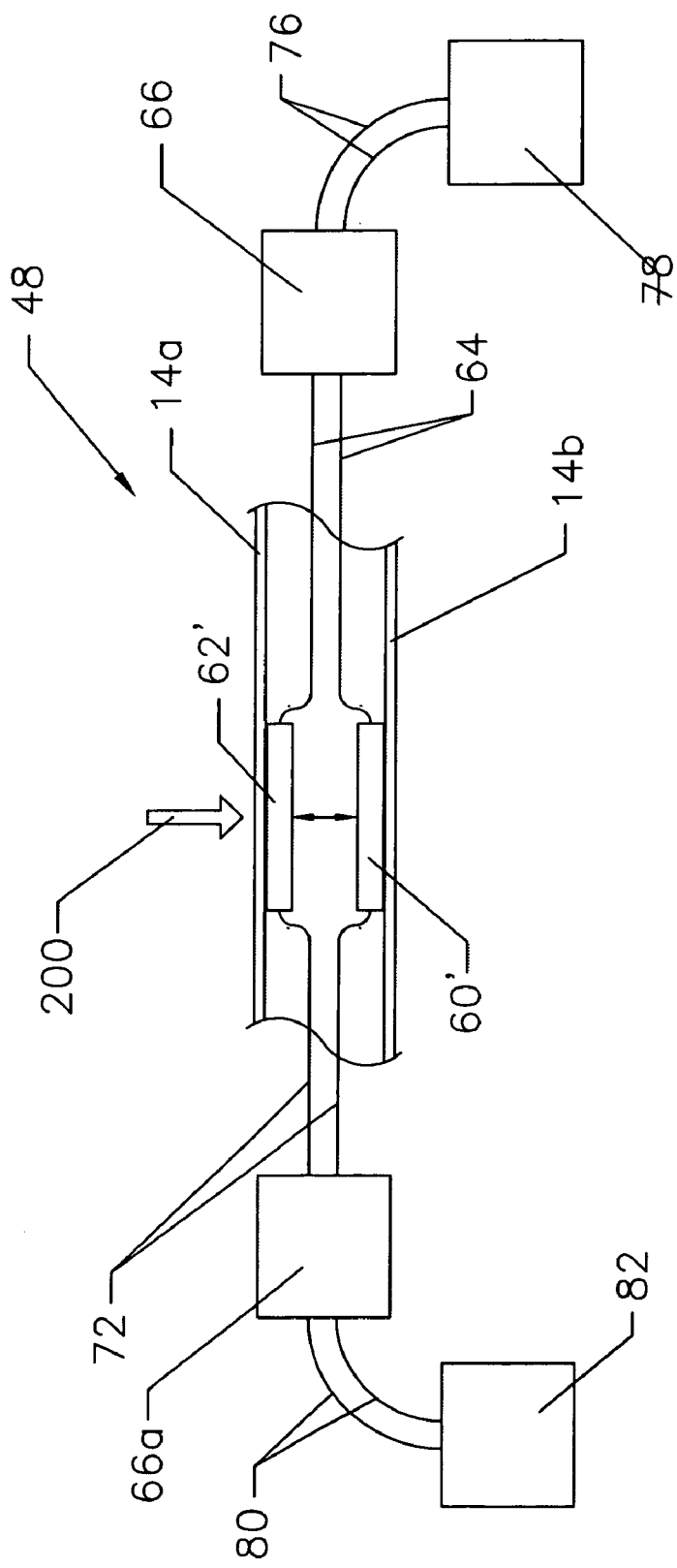
FIG. 7 shows a schematic of a horn/light controller according to another according to another embodiment of the disclosure.

Referring to FIGS. 5-7 and 11, in another aspect of the invention, a dual action horn/light controller 48 enables a vehicle operator to engage the horn/light systems of the vehicle with a single control. As shown in FIGS. 5 and 7, dual horn/light activation is accomplished by pressing a single controller 48. In this embodiment, the dual activation of the horn and light systems is independent of the amount of pressure applied to controller 48.

Referring to FIG. 7, by depressing controller 48 with a pressure 200, contact is made between an upper contact 62' and a lower contact 60'. The pressure needed to activate controller 48 can be set at anything greater than 0 lbs/in$^2$ by using flexible materials for the spoke/controller and/or spring and/or recoil elements about the contacts. Contacts 60 and 62' are enclosed in a cavity formed by an upper spoke segment 14a and a lower spoke segment 14b. By touching the contacts together, a circuit is completed which sends an electrical signal via light lines 72 to light relay 66a. The signal is then sent via light relay lines 80 to light(s) 82. Substantially simultaneous with the transmission of an electrical signal to light(s) 82, a second electrical signal is sent to horn relay 66 via horn lines 64. The second electrical signal is then sent via horn relay lines 76 to horn 78. It should be understood that with respect to light relay 66a at least one additional pair of lines connects the conventional light controls to the relay.

With respect to the embodiment shown in FIGS. 5 and 7, to enable a driver to disconnect the light function from the horn function, a control switch 50 is positioned in electrical communication between controller 48 and light relay 66a. The "on" setting may be configured to disconnect light relay 66a from controller 48 or connect the two elements.

In another aspect of the disclosure, a dual action controller 48 engages either the horn system independent of the light system or both the horn and light systems substantially simultaneously by varying the pressure applied to the controller. The functionality is achieved by incorporating two sets of contacts with one set of contacts superposed about the other set or positioned above the other set.

As shown in FIG. 6, an upper horn contact 70 is positioned above a lower horn contact 68. Positioned below lower horn contact 68 is an upper light contact 62. Positioned below upper light contact 62 is lower light contact 60. The application of a relatively light pressure, for example, less than 5 lbs/in$^2$, causes the horn contacts to engage and complete an electrical circuit, which sends an electrical signal to relay 66, and on to horn 78 without engaging the light system. The application of a more forceful pressure, in this illustrative example, 5 lbs/in$^2$ or greater, causes both contact systems to engage thereby activating both the horn and light systems.

It should be understood that the pressure range to engage the horn system without the light system can be set to any desired range of pressure values. The pressure needed to engage both the horn and light systems can also be set to any predetermined range as long as the pressure range is greater than the pressure range set to operate the horn system alone. For example, if the horn system pressure range is set from about 1 Lb/in$^2$ to about 10 lb/in$^2$, the combination horn/light system pressure range should start at a value greater than 10 lb/in$^2$.

The pressure differential between the upper limit of the horn operation pressure range and the lower limit of the horn/light operation pressure range should be sufficiently large to enable a vehicle operator a wide latitude of pressure choices to activate the desired horn system or horn/light system without having to apply a precise pressure. For example, the pressure differential separating the two ranges can be from about 1 Lb/in$^2$ to about 10 lb/in$^2$. Of course, any pressure differential less than or greater than this exemplary range is considered to be within the scope of the appended claims, and consistent with the scope and spirit of this invention disclosure.

Figure 8:
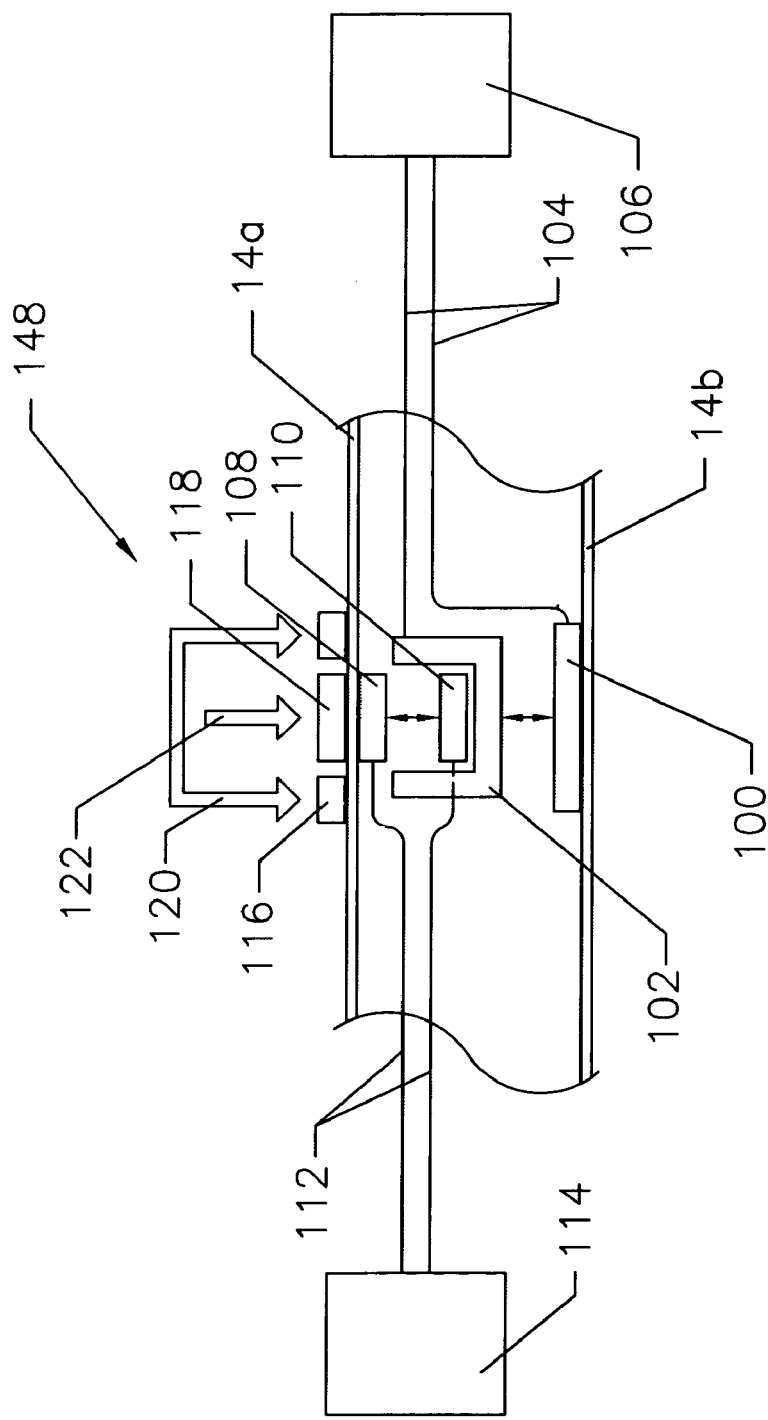
FIG. 8 shows a schematic of a horn/light controller according to a further embodiment of the disclosure.
Figure 8A:
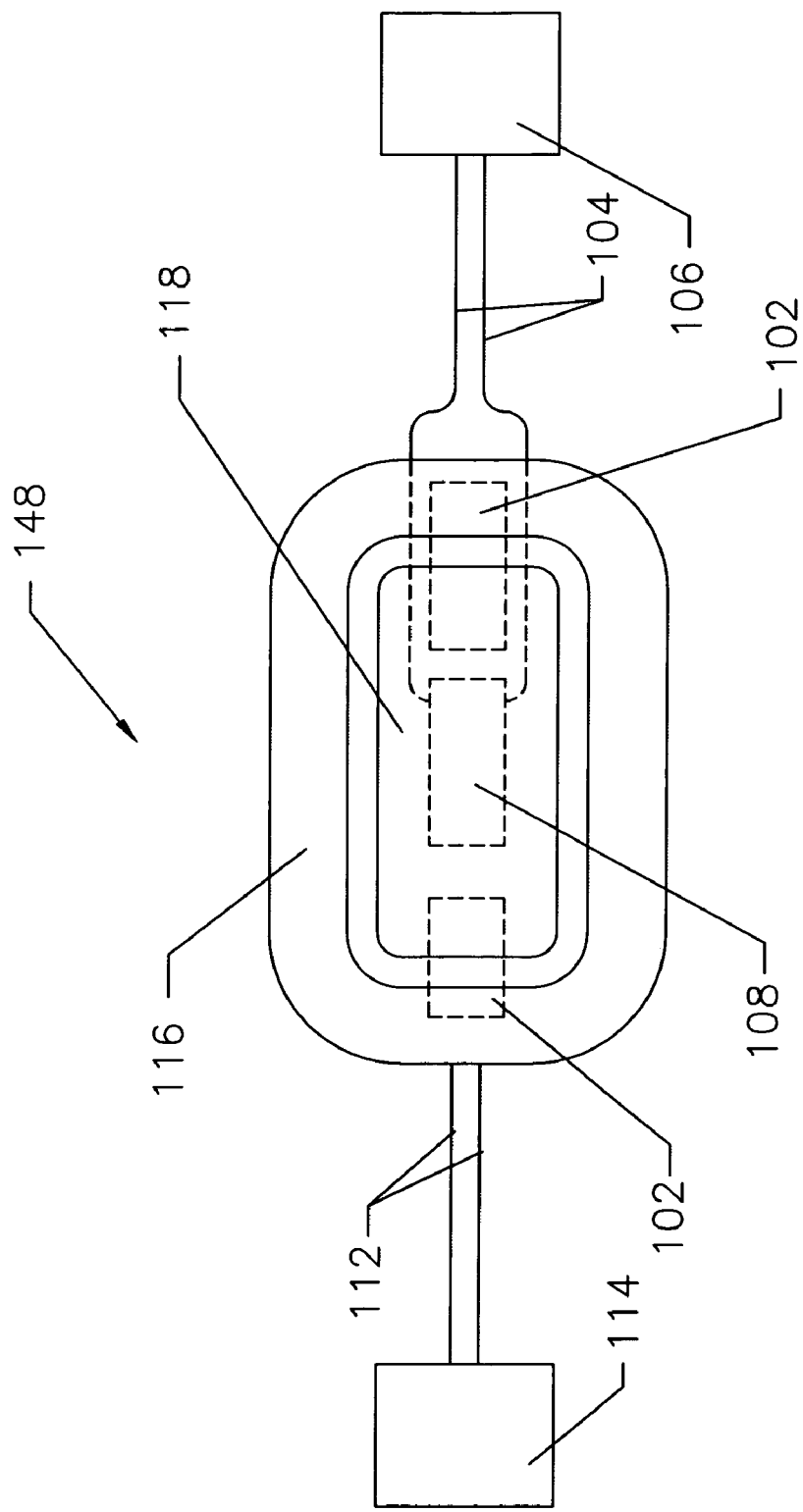
FIG. 8A shows a top view of the horn/light controller shown in FIG. 8 with contacts in phantom according to the further embodiment of the disclosure.

In another aspect of the disclosure, two different controllers are employed to allow variability and selectivity in the warning devices implemented to impart a warning signal without the need to apply a specific pressure force, or a pressure force within a pressure range. As shown in FIGS. 8 and 8A, a central controller 118 provides the ability to activate both the horn and the light systems with a single controller. A top light contact 108 is positioned below central controller 118 and above bottom light contact 110. Situated below bottom light contact 110 is upper horn contact 102. Upper horn contact 102 is formed as a disk-like structure with a circular extension projecting upwardly around the light contacts. Positioned directly above the circular extension is a dedicated horn controller 116 that at least partially surrounds central controller 118. Positioned directly below upper horn contact 102 is lower horn contact 100.

To activate both the horn and light systems, a force 122 is applied directly or indirectly to central controller 118, which causes the light contacts to touch and complete a circuit that sends an electrical signal via light lines 112 ultimately to light 114. Force 122 also causes the horn contacts to engage and send an electrical signal via horn lines 104 ultimately to horn 106. Either system can incorporate relays as previously described or a central processing system to relay the signals to the warning systems.

To activate the horn independent of the lights, a second force 120 is applied to dedicated horn controller 116, the downward force of which causes horn contacts 100 and 102 to engage and send a signal to horn 114. This system can incorporate one or more relays as previously described or a central processing system to relay the signal to the horn system.

Figure 10:
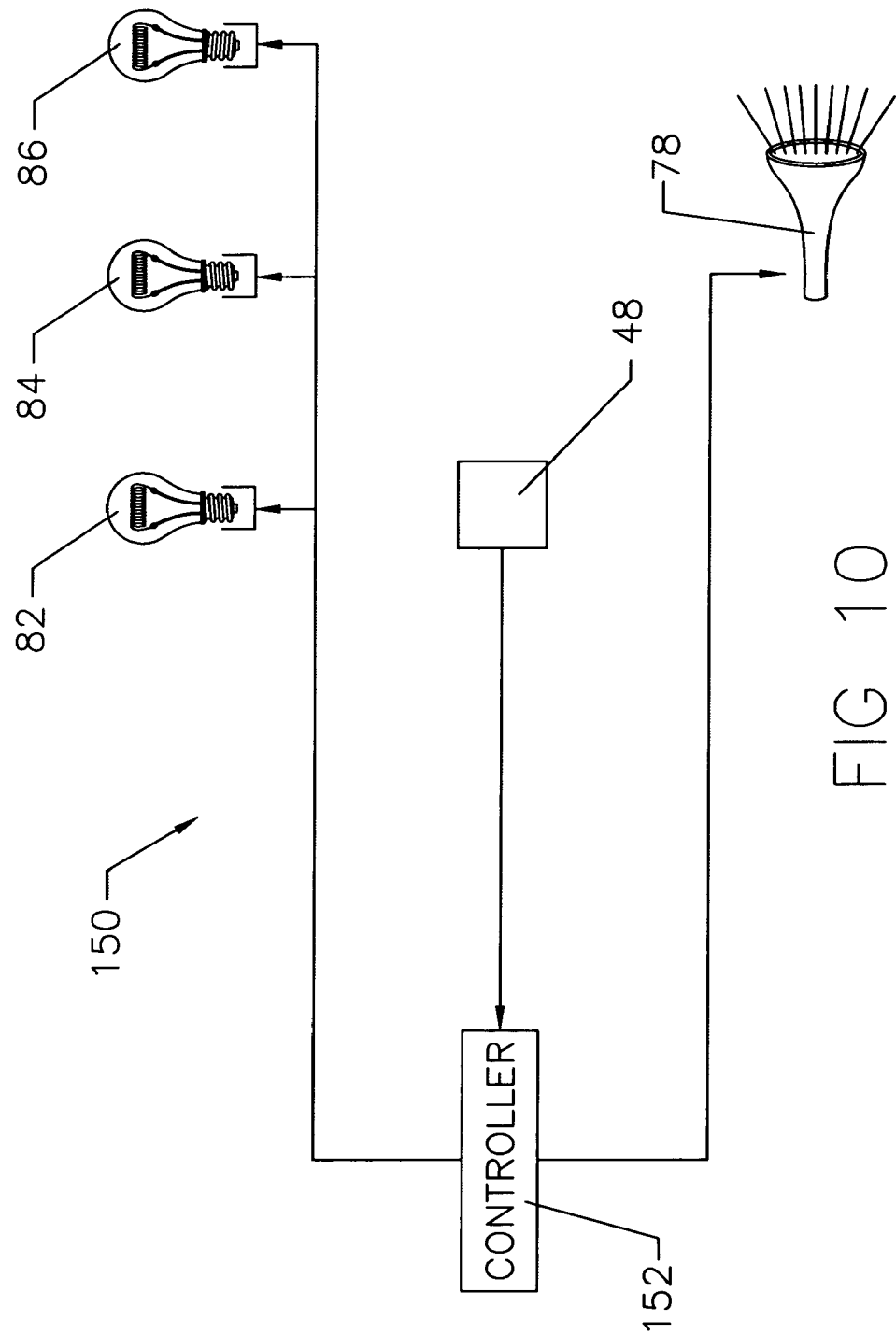
FIG. 10 shows a schematic of a combined horn/multiple light operating system with a central processing controller according to another embodiment of the invention.
Figure 11:
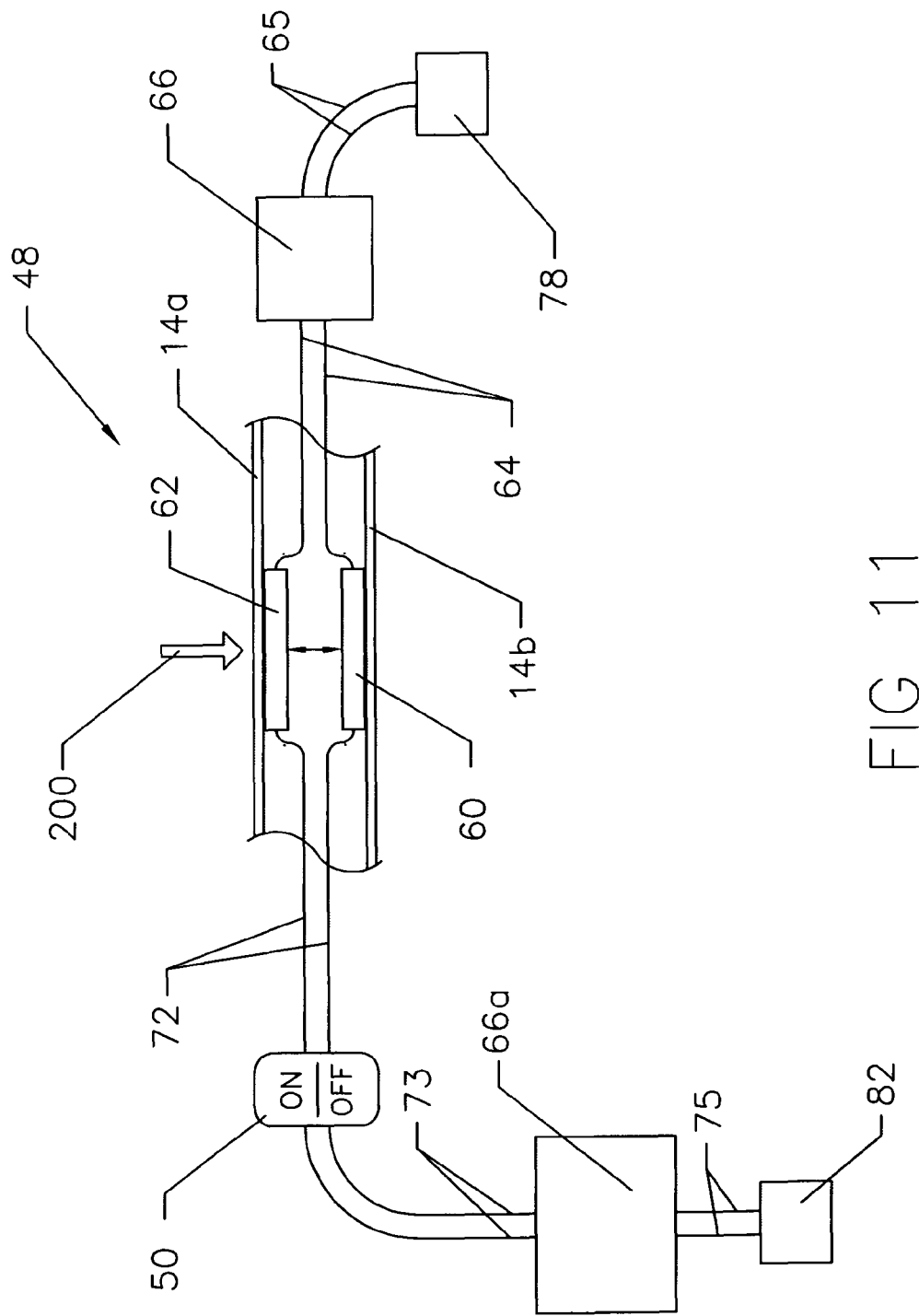
FIG. 11 shows a schematic of a combined horn/light operating system with a light deselect switch according to a further embodiment of the disclosure.

Referring now to FIG. 9, a dual horn/light operating system is shown in which controller 48 is connected via hard wire or wirelessly with one or more RF or infra-red transmitters and one or more RF or infrared receivers to a central processing unit or controller 152. Central processing controller receives the signal from controller 48 and processes it according to preconfigured programming to send a desired signal to the horn and light systems to emit the desired warning signal. As is well known in the art, central processing controller 152 can be programmed to operate a specific light 82 and/or multiple lights 82, 84, and 86 as shown in FIG. 10. Controller 152 may also be programmed to activate the light system to emit pulsing light flashes in some pre-determined pattern to impart a specific type of warning signal(s).

In another aspect of the invention, in place of controller 48, a sensor can be imbedded in either the steering wheel, steering column and/or steering wheel spoke(s) to detect a force being exerted on a location above the sensor in the form of downward pressure derived from an occupant of the vehicle. The sensor may be calibrated to detect a specific range of force representative of the downward pressure sensed or may be configured to detect any pressure above a threshold level, which may be as low as any force slightly above 0 lbs./in.$^2$.

It should be understood and apparent that light configurations shown are for illustrative purposes only and that any combination of light configurations may be possible, including head lights in both high and low beam settings, fog lights, driving lights, parking lights, reverse lights, braking lights, interior lights and dedicated lights included in a vehicle for the specific purpose of operating in conjunction with the vehicle horn system. Redundant sets of lights placed on the rear, sides and/or front of vehicle may also be included for warning specific purposes.

It should also be understood and apparent that the lights may be any of a variety of types including incandescent, halogen, ultra violet, infrared and the like. The lights may be further modified to function as strobe or flashing lights to make more conspicuous and improve visibility when a warning signal is being sent. In the event dedicated warning lights are incorporated into a vehicle, the lights may be further distinguished from the conventional lights by being colored with a color selected to be different from the colors used for other vehicle lights like red for brake lights, or emergency lights, such as blue used on law enforcement vehicles. Color schemes may also be implemented to signify different types of warnings. For example, a yellow light could designate an approaching hazard while a green light could signify imminent danger.

The dual horn/light system described herein is intended for implementation in any vehicle used to carry passengers including illustratively boats, trains, buses (commercial and school), cars, vans, SUV's and trucks. The system can be implemented for internal warning, such as in a school bus, to ensure children seated in the bus are properly alerted to any imminent danger While the present disclosure has been described in connection with several embodiments thereof, it will be apparent to those skilled in the art that many changes and modifications may be made without departing from the true spirit and scope of the present disclosure. Accordingly, it is intended by the appended claims to cover all such changes and modifications as come within the true spirit and scope of the disclosure.

What we claim as new and desire to secure by United States Letters Patents is:

1. An apparatus for operating a vehicle horn and light system simultaneously comprising:
   a vehicle steering wheel/steering column assembly;
   a vehicle horn system for emitting audible signals;
   a vehicle light system for emitting visual signals;
   a dual function controller positioned in the vehicle steering wheel/steering column assembly for simultaneously operating the horn and lights systems;
   at least one horn contact positioned below the controller; and,
   at least one light contact positioned either above or below the horn contact, wherein application of a single force in a single direction to the dual function controller engages the horn contact and the light contact to activate the horn and light systems substantially simultaneously.

2. The apparatus of claim 1 further comprising at least one light in the light system wherein the controller operates the at least one light when the controller is engaged via pressure.

3. The apparatus of claim 2 further comprising a central processing system connected between the controller and the horn and light systems to process and relay signals from the controller to the horn and light systems.

4. The apparatus of claim 2 wherein the controller is wired directly to the horn and light systems.

5. The apparatus of claim 4 further comprising a relay between the controller and horn system.

6. The apparatus of claim 4 further comprising a relay between the controller and light system.

7. The apparatus of claim 2 further comprising at least one transmitter connected to the controller and at least one receiver connected to the horn and light systems to wirelessly transmit signals from the controller to the horn and light systems.

8. The apparatus of claim 1 wherein the controller comprises a pair of horn contacts and a pair of light contacts whereby an electrical signal is sent to the horn system when the horn contacts touch and an electrical signal is sent to the light system when the light contacts touch.

9. The apparatus of claim 1 further comprising a light control switch positioned in the vehicle and positioned electrically between the controller and the light system wherein the light control switch disengages the light system from control of the controller when activated.

10. An apparatus for operating a vehicle horn and light system simultaneously comprising:
    a vehicle steering wheel/steering column assembly comprising a steering wheel and a steering column connected to the steering wheel;
    a vehicle horn system for emitting audible signals;
    a vehicle light system for emitting visual signals;
    a dual function controller lever positioned on the steering column for simultaneously operating the horn and lights systems;
    at least one horn contact positioned below the controller lever; and,
    at least one light contact positioned either above or below the horn contact, wherein application of a single force in a single direction to the dual function controller lever engages the horn contact and the light contact to activate the horn and light systems substantially simultaneously.

11. The apparatus of claim 10 wherein the controller lever further comprises a pair of horn contacts and a pair of light contacts whereby an electrical signal is sent to the horn system when the horn contacts touch and an electrical signal is sent to the light system when the light contacts touch.

12. A method of operating a vehicle horn and light system simultaneously comprising the steps of:
    providing a vehicle steering wheel/steering column assembly;
    providing a vehicle horn system for emitting audible signals;
    providing a vehicle light system for emitting visual signals;
    providing a dual function controller positioned in the vehicle steering wheel/steering column assembly for simultaneously operating the horn and lights systems;
    providing at least one horn contact positioned below the controller;
    providing at least one light contact positioned above or below the horn contact, wherein the application of a first pressure force in one direction causes the horn system to engage independent of the light system and wherein the application of a second pressure force greater than the first pressure force in the same direction causes the horn and light systems to be activated substantially simultaneously; and,
    applying the second pressure force on the controller to operate the horn and light systems substantially simultaneously.

13. The method of claim 12 wherein the first pressure force is from about 0 lbs/$in^2$ to about 5 lbs/$in^2$.

14. The method of claim 12 wherein the second pressure force is greater than 5 lbs/$in^2$.

15. The method of claim 12 further comprising the step of:
    providing a pair of horn contacts and a pair of light contacts connected to the controller whereby an electrical signal is sent to the horn system when the horn contacts touch and an electrical signal is sent to the light system when the light contacts touch, the second pressure force causing the horn and light contacts to touch.

* * * * *